Jan. 5, 1954
G. L. MANDAVILLE
2,664,885
STEREOSCOPIC DEVICE
Filed Nov. 26, 1951
2 Sheets-Sheet 1
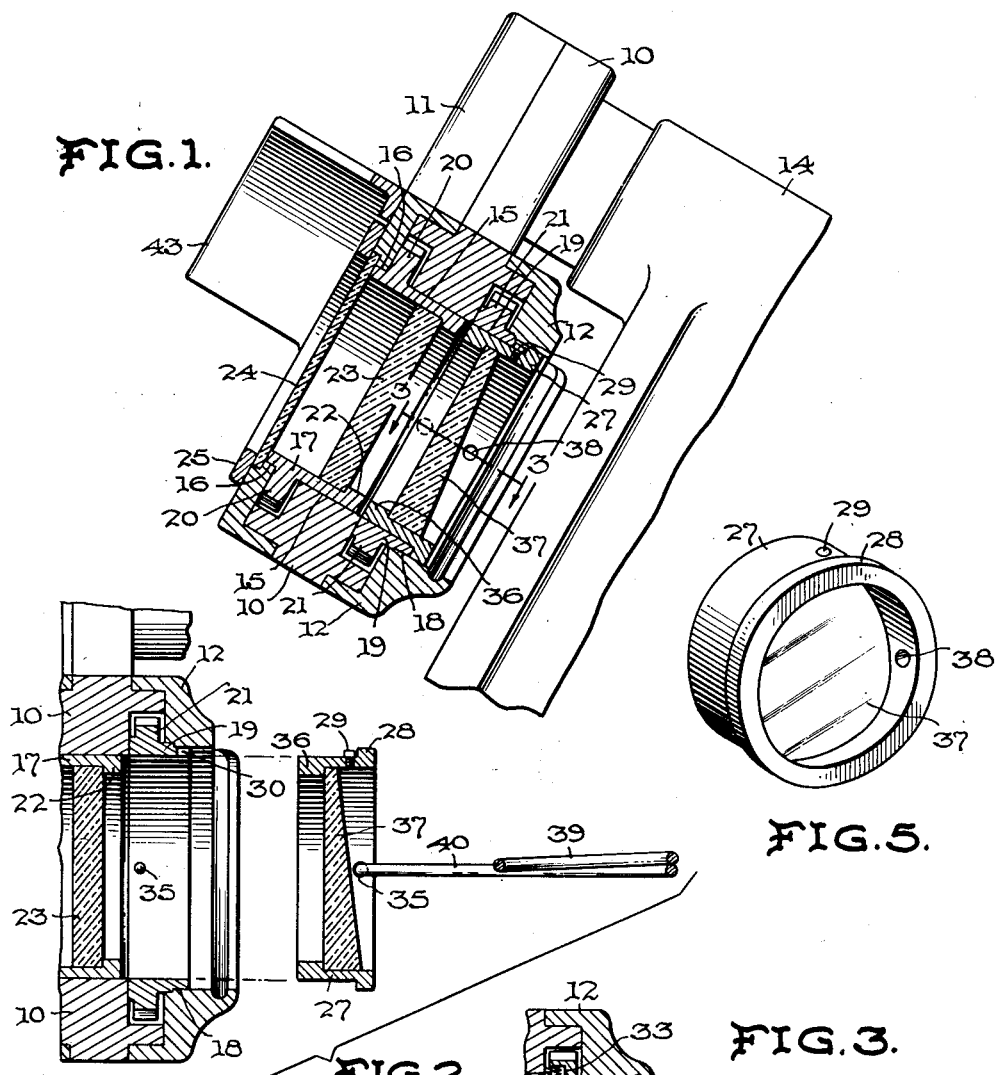
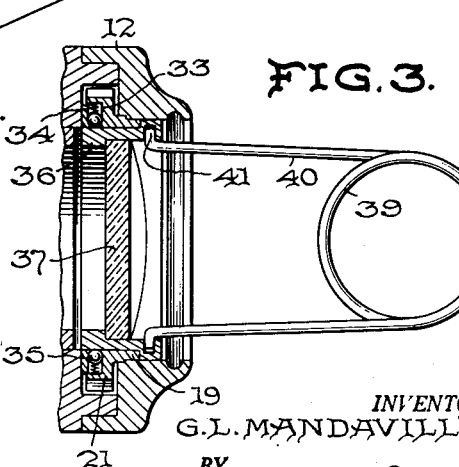
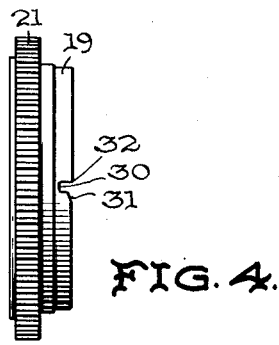
INVENTOR.
G. L. MANDAVILLE
BY
Estabrook & Estabrook
ATTORNEYS Jan. 5, 1954

G. L. MANDAVILLE 2,664,885

STEREOSCOPIC DEVICE

Filed Nov. 26, 1951

INVENTOR.
G. L. MANDAVILLE

BY
Estabrook & Estabrook

ATTORNEYS

Patented Jan. 5, 1954

2,664,885

UNITED STATES PATENT OFFICE 2,664,885

STEREOSCOPIC DEVICE

Gurney L. Mandaville, Fort Pierce, Fla.

Application November 26, 1951, Serial No. 258,212

7 Claims. (Cl. 128—76.5)

This invention relates broadly to stereoscopic devices and more particularly to such a device for training the human eyes to bring about coordination between accommodation and convergence.

The present invention constitutes an improvement of the structure disclosed in my prior Patent 2,186,418 of January 9, 1940.

It has been found, through usage of the stereoscopic device disclosed in the aforementioned patent, that as the muscles of the human eye become strengthened, due to prescribed usage and training, the arrangement or combination of prisms employed in the instrument have to be changed. That is, as the program of training a person's eyes gradually advances to bring about coordination between accommodation and convergence the combination of prisms employed in the rotating cylinders have to be changed or varied to obtain the degree of intensity required by the condition of the eyes.

In the stereoscopic training device disclosed in the aforementioned patent the prism holders or head structure include ring gear cylinders mounted in the head structure for rotation therein with prisms secured in the cylinders in a definite pattern and relationship. With the prisms so mounted in the cylinders the changing or varying of the relationship of the various prisms, as the training program progresses, has presented a problem of some magnitude. In view of the fact that the prisms are mounted within the cylinders in a definite pattern or relationship, as the head structure is assembled, and, as such, constitute a unit that is designed for use up to a specific stage in the training program, it has been customary to supply a plurality of head structures or units for use with each training device. While substituting one complete head unit for another having a different prism arrangement is perfectly feasible, with the stereoscopic device of the aforementioned patent, considerable time is expended in effecting such a change and at the same time materially adding to the cost of the device through the necessity of having available a number of different head units.

It has been found from experience that in a great majority of instances the proper and correct relationship of prisms may be effected through changing the prismatic lenses positioned within the rear cylinders of the training device shown in the above mentioned patent. Such a procedure enables the stereoscopic training device to be furnished with a single head unit and a plurality of interchangeable prismatic lenses for use in the rear cylinders. This type of arrangement not only reduces the cost of the device but also simplifies the procedure of changing the lenses in order to increase or decrease the intensity of the prismatic lens arrangement.

One of the objects of the present invention is to provide a stereoscopic training device having rotatable ring gear cylinders for receiving interchangeable prismatic lens carrying sleeves.

Another object is to provide a stereoscopic training device having ring gear cylinders with spring actuated members for engaging and retaining the prismatic lens carrying members within said cylinders.

Another object is to provide each ring gear cylinder with a slot for receiving a guide pin provided on each prismatic lens carrying sleeve to insure the correct and proper positioning of the lens carrying sleeve within the cylinder.

A further object is to provide each lens carrying member with a pair of diametrically disposed recesses for receiving a tool whereby said members may be inserted into or removed from the ring gear cylinders while said cylinders are rotating.

Still further objects are to provide a stereoscopic training device having a head unit that is simple in construction, economical of manufacture and capable of having certain of the prismatic lenses readily changed while the device is in operation.

Other objects and advantages more or less ancillary to the foregoing and the manner in which all of the various objects are realized will appear in the following description which, considered in connection with the accompanying drawing, sets forth the preferred embodiment of the invention.

Referring to the drawing wherein the preferred embodiment of the invention is illustrated:

Figure 1 is a side elevational view partly in section of a head unit for a stereoscopic training device;

Figure 2 is an exploded sectional view of one of the rear ring gears and lens carrying members in an unassembled position with a tool for inserting or removing the lens carrying member;

Figure 3 is a sectional view with a portion in elevation showing the tool for engaging and inserting the lens carrying member into the ring gear, the portion of the figure in section being taken on the plane 3—3 of Figure 1;

3

Figure 6:
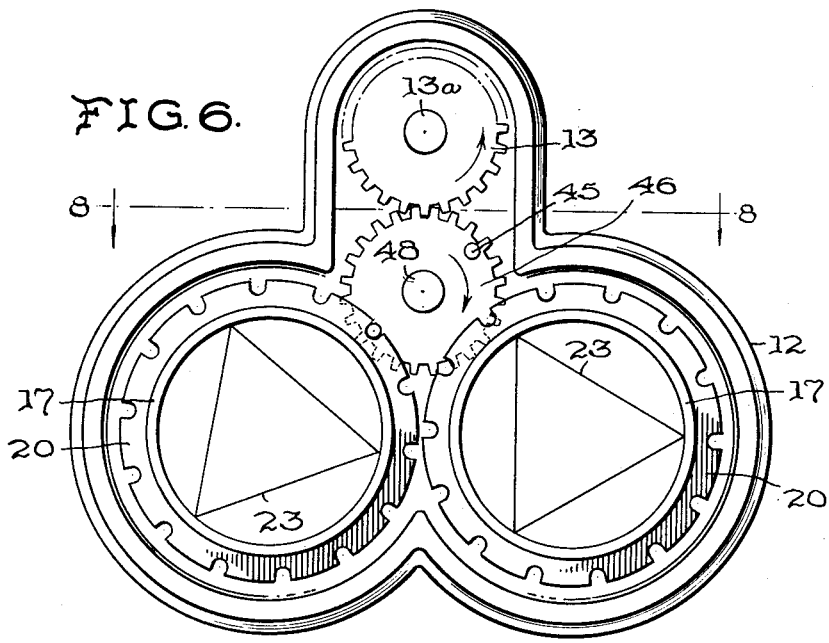
Figure 7:
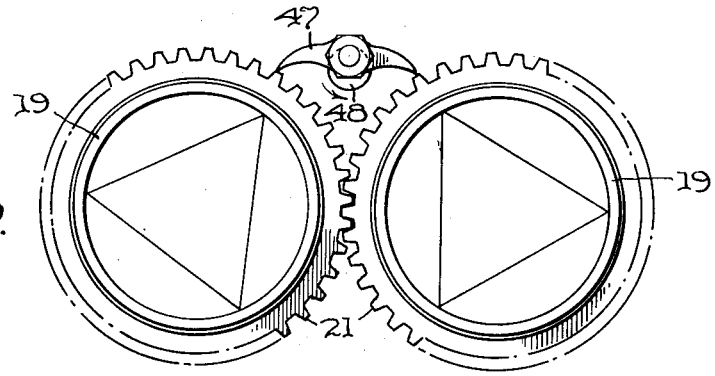
Figure 8:
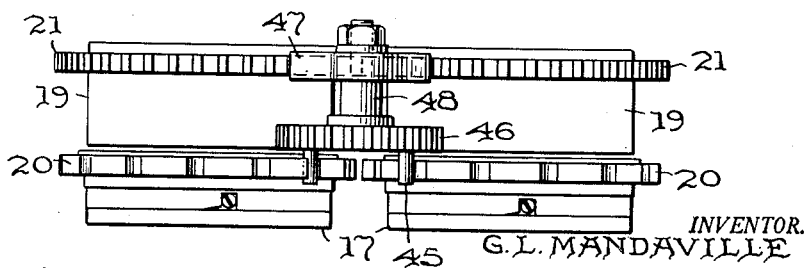

Figure 4 is a side elevational view of a rear ring gear;

Figure 5 is a perspective view of a lens carrying member;

Figure 6 is a front elevational view of a head unit for a stereoscopic training device with the front cover or casing removed;

Figure 7 is a detailed elevation of the rear pair of ring gears and cylindrical lens carrying members and showing the driving mechanism for said ring gears; and Figure 8 is a horizontal sectional view with the casing removed showing the front and rear pairs of ring gears and a portion of the drawing mechanism therefor, the section being taken on the plane 8—8 of Figure 6, Referring to the drawings where in Figure 1 there is shown a head unit of a stereoscopic training device embodying a base member 10 having a front cover member 11 and a rear cover member 12 retained in assembled relation by frictional engagement or any other suitable manner. The base member 10 has disposed in the top portion thereof a gear 13, Figure 6, which is connected by a suitable shaft 13a, Figure 6, to a driving mechanism, not shown, positioned within the housing 14. The base 10 and front cover 11 are formed with suitable bearing surfaces 15 and 16, respectively, for supporting a pair of front or forward cylinders 17, Figures 6 and 8, while the rear cover member 12 is formed with a suitable bearing surface 18 for supporting a pair of rear cylinders 19, Figures 7 and 8. It is to be understood that the head unit of the present invention embodies a pair of front cylinders 17 and a pair of rear cylinders 19 in the same relationship as disclosed in Patent 2,186,418. The front and rear cylinders 17 and 19, respectively, have external ring gears 20 and 21 formed integrally therewith for rotating said cylinders. The driving mechanism for rotating the ring gears 20 and 21 is for all intents and purposes of the present invention the same as shown in Patent 2,186,418. Inasmuch as the elements constituting the driving mechanism are not a part of the present invention, a description of same is not deemed necessary. It might be pointed out that the head unit contains the pair of front ring gears 20 and the pair of rear ring gears 21, with the front ring gears being rotated in the same direction by pins 45, Figure 6, carried by the rotating gear 46 which meshes with the gear 13 while the rear ring gears which mesh with one another are rotated in opposite directions by a pawl 47 which is carried on one end of a crank shaft 48 with the gear 46 mounted on the other end thereof. In view of the fact that the two front cylinders are identical and the two rear cylinders are identical the following description will be directed to only a single front and a single rear cylinder.

The front cylinder 17, at its inner end, is formed with an annular flange 22 which defines a seat for the front or forward prismatic lens 23. The lens 23 is preferably mounted on its seat by any suitable adhesive with the bases of the prisms in the two front cylinders 17 being placed at approximately the same angle from the center so that the bases of both prisms are in the same relationship to one another, that is base down and base up. With the prisms so mounted in the front cylinders 17 the apexes of both prisms will be either pointing up or down or to the left or to the right at the same time due to the rotation of the cylinders 17 in the same direction. The front

4 cover 11 is provided with a glass cover 24 which is in alignment with the lens 23. The glass cover 24 is retained in place on the cover 11 by a rear plate 25, Figure 1.

A cylindrical prismatic lens carrying sleeve or member 27, Figures 3 and 5, is slidably mounted within the rear cylinder 19. The cylindrical lens carrying member 27 is formed at its outer end with an external annular rim or projection 28 which is adapted to abut the outer edge of the rear cylinder 19 to limit the inward movement of the lens member 27 as it is being inserted within the cylinder. The external diameter of the rim portion 28 of the lens carrying member 27 is the same as the external diameter of the rear cylinder 19, so that when the lens member 27 is inserted within the cylinder 19 the outer surface of the rim portion 28 will lie in the same plane as the outer surface of the cylinder 19 and engage the bearing surface 18 of the rear cover member 12.

The cylindrical member 27 is provided with a guide pin 29 that is mounted on the outer surface of the member 27 adjacent the rim portion 28. The outer edge of the rear cylinder 19 is provided with a slot 30, Figure 4, which is adapted to receive the guide pin 29 and thus facilitate the insertion of the cylindrical member 27 into the cylinder 19. As shown in Figure 4, the outer edge portion of the cylinder 19 defining the slot 30 is formed with a beveled edge or corner 31 which is adapted to guide the pin 29 into the slot 30. That is, by providing the outer edge of the cylinder 19 with the beveled edge portion 31 the guide pin 29, upon inserting the cylindrical sleeve 27 into the cylinder 19, will ride along the outer edge of the cylinder 19 until it reaches the slot 30, and due to the curvature of the beveled edge 31 the pin 29 will be directed into the slot 30. The portion of the outer edge of the cylinder 19 defining the opposite side of the slot 30 will act as a limit stop 32 for the guide pin 29. Thus, it will be apparent that the cylindrical member 27 may be inserted into the cylinder 19 while the cylinder is either rotating or stationary. If the cyplinder 19 is rotating the member 27 may be inserted therein until the pin 29 abuts the outer edge of the cylinder 19 and by holding the member 27 and pin 29 in engagement with the cylinder 19 the pin will eventually ride around the beveled edge 31 and into the slot 30. The side 32 of the slot acting as a limit stop prevents the pin 29 from moving past the slot 30.

The cylinder 19 is provided on its inner surface adjacent its inner end with a pair of diametrically disposed recesses 33, Figure 3, which are adapted to receive springs 34. There is also mounted within the recesses 33, in engagement with the springs 34, balls 35 which are adapted to project outwardly slightly from the inner surface of the cylinder 19. The spring actuated balls 35 are adapted to engage the outer surface of the cylindrical member 27 for retaining said member within the cylinder 19, as shown in Figure 3.

The cylindrical member 27 is formed, adjacent its inner end, with an inwardly projecting annular flange 36 which is adapted to define a seat for a prismatic lens 37, Figure 2. The lens 37 is preferably secured to its seat within the cylindrical member 27 by any suitable adhesive. The lens 37 is mounted on its seat within the member 27 with the apex of the prism pointing towards the guide pin 29. With the lens 37 so mounted within the member 27 each member 27 with its respective lens will be properly positioned within its respective rear cylinder 19 through the movement of the guide pin 29 into the slot 30. The slot 30 is formed in the same position in the two rear cylinders 19 so that when the members 27 with their lenses 37 are inserted in the cylinders 19 the apexes of the lenses 37 would in one instance be pointing up. However due to the fact that the rear cylinders rotate in opposite directions with respect to one another the apex of one of the lenses 37 would be moved in a clockwise direction while the apex of the other lens 37 would be moved in a counterclockwise direction when looking from the front towards the rear of the head unit. Thus with the apexes of the lenses 37 in the rear cylinders moving in a clockwise and a counterclockwise direction the two apexes during one half of a complete revolution would be moving towards one another while during the other half of the same revolution the apexes would be moving away from one another. The lenses in the rear cylinders do not synchronize with the lenses in the front cylinders but instead operate as an independent unit. Thus it is essential that the lenses 37 in the members 27 be mounted within the rear cylinders 19 in proper relation to one another so that as the rear cylinders are rotated in opposite directions the lenses 37 will be rotated in the foregoing manner. It is due to the guide pin 29 on the member 27 moving into the slot 30 in the rear cylinders 19 that the lenses 37 within the members 27 are properly positioned with respect to one another within the rear cylinders 19 and secured therein.

The inner surface of the cylindrical member 27, within the area encompassed by the rim portion 28, is formed with a pair of diametrically disposed recesses 38, Figure 5, which are adapted to receive the ends of a suitable tool for inserting the cylindrical prismatic lens carrying member 27 into the rear cylinder 19. The tool for inserting the lens carrying member 27 is preferably formed from a single strand of wire and includes a single convolution portion 39 terminating in a pair of legs 40 which are provided at their free ends with outwardly projecting portions 41 which are adapted to be inserted into the recesses 38 provided in the sleeve member 27. The front of the head unit is provided with a hood or vizor 43 for shielding the light from the user's eyes.

In the operation or use of the present device the legs 40 of the tool are compressed towards one another so that the outwardly extending projections 41 on the legs 40 may be inserted into the diametrically disposed recesses 38 provided in the inner surface of the cylindrical member 27. With the cylindrical member 27 supported on and carried by the legs 40 of the tool, the cylindrical member 27 is inserted into the rear cylinder 19 until the pin 29 strikes the outer edge of the cylinder 19. After the guide pin has engaged the outer edge of the cylinder 19 the cylindrical member 27 is rotated in the proper direction so that the guide pin will ride over the beveled edge 31 and into the slot 30. As the guide pin 29 enters the slot 30 the cylindrical member 27 is forced into the cylinder 19, which action forces the balls 35 into the recesses 33 against the action of the springs 34 and thus locks the cylindrical member 27 within the cylinder 19. With the cylindrical member 27 locked within the cylinder 19 the legs 40 of the tool are compressed towards one another to facilitate the removal of the projections 41 of the legs 40 from the recesses 38 so that the tool may be detached from the sleeve 27. In the event that it is desired to change the prismatic lens positioned within the rear cylinder 19 the projections 41 of the tool member are inserted into the recesses 38 and the sleeve 27 may then be withdrawn from the cylinder 19 and another sleeve 27 having a prismatic lens of different intensity may then be inserted in the cylinder 19.

The cylindrical prismatic lens carrying member 27 may either be inserted into or removed from the cylinder 19 while the cylinder is being rotated. That is, different cylindrical members 27 may be substituted for one another without necessitating the stopping of the machine. With the cylinder 19 rotating the cylindrical member 27, supported upon the legs 40 of the tool member, may be readily inserted within the cylinder 19 until the pin 29 engages the outer edge of the cylinder. At this time the cylindrical member 27 may be held in a stationary position and as the cylinder 19 continues to rotate the guide pin 29 will move along the outer edge of the cylinder 19 and gradually ride over the beveled edge 31 and into the slot 30. After the guide pin 29 has moved into the slot 30 the cylindrical member 27 may be forced into the cylinder 19 until the rim portion 28 abuts the outer edge of the cylinder 19 at which time the balls 35 will have been forced into the recesses 33 and the cylindrical member 27 securely locked within the cylinder 19.

Thus, it is readily apparent that a stereoscopic training device utilizing the head unit of the present invention is capable of varying the intensity of the prismatic lenses mounted in the rear cylinder members by readily changing the rear prismatic lenses. Thus, as a training program progresses the intensity of the lenses employed may be varied by readily replacing the rear prismatic lenses with lenses of different intensity without stopping the operation of the machine.

I claim:

1. In combination with a stereoscopic training device embodying a pair of lens carrying front cylinders having external ring gears formed integrally therewith for rotating said cylinders in the same direction, a pair of rear cylinders having external ring gears formed integrally therewith adjacent the inner ends and intermeshing with one another for rotating said rear cylinders in opposite directions, said rear cylinders being disposed in aligned relation with said front cylinders, sleeves slidably mounted in said rear cylinders, a pin provided on the external surface of said sleeves and adapted to engage the outer end of said rotating rear cylinders during the insertion of said sleeves into said rear cylinders, prismatic lenses mounted in said sleeves with their apexes pointing towards said pins, said rear cylinders having a slot formed in the outer ends thereof for receiving said pins, the portion of said rear cylinders defining one side of said slot constituting a limit stop member for said pins and the portion of said rear cylinder defining the other side of said slot being provided with a beveled edge for guiding said pin into said slot to position the apex of the lens in one of said rear cylinders in proper relation to the apex of the lens in the other rear cylinder so that said apexes will move towards one another during one half of the rotation of said rear cylinders and will move away from one another during the other half of the rotation of said rear cylinders, means on said sleeves engageable with the outer ends of said rear cylinders for limiting the movement of said sleeves into said rear cylinders and locking means in said rear cylinders for securing the sleeves therein.

2. A stereoscopic training device embodying a pair of cylinders having external ring gears formed integrally therewith and intermeshing with one another for rotating said cylinders in opposite directions, said cylinders having slots formed therein, sleeves slidably mounted in said cylinders, prismatic lenses mounted in said sleeves, guide means on said sleeves for insertion into said slots for removably positioning the prismatic lens in one sleeve in relatively opposed relation to the prismatic lens in the other sleeve and spring actuated means provided in said cylinders for retaining said sleeves therein.

3. A stereoscopic training device embodying a pair of cylinders having external ring gears formed integrally therewith and intermeshing with one another for rotating said cylinders in opposite directions, said cylinders having slots formed therein, sleeves slidably mounted in said cylinders, prismatic lenses mounted in said sleeves, guide means on said sleeves for insertion into said slots for removably positioning the prismatic lens in one sleeve in relatively opposed relation to the prismatic lens in the other sleeve, spring actuated means provided in said cylinders for retaining said sleeves therein and means on said sleeves engageable with said cylinders for limiting the movement of said sleeves into said cylinders.

4. A stereoscopic training device embodying a pair of cylinders, external ring gears mounted on said cylinders and intermeshing with one another for rotating said cylinders in opposite directions, sleeves slidably mounted in said cylinders, a pin provided on the external surface of said sleeves, an internal annular flange formed in said sleeve adjacent an end thereof and defining a seat, prismatic lenses mounted in said sleeves on said seats with the apexes of the prisms pointing towards said pin, said cylinders having slots formed therein for the reception of said pins to removably position the prismatic lens in one sleeve in relatively opposed relation to the prismatic lens in the other sleeve, locking means in said cylinders engageable with said sleeves for retaining said sleeves within said cylinders and an external annular rim formed on said sleeves engageable with said cylinders for limiting the movement of said sleeves into said cylinders.

5. A stereoscopic training device embodying a pair of cylinders, external ring gears formed integrally with the cylinders and intermeshing with one another for rotating said cylinders in opposite directions, sleeves slidably mounted in said cylinders, a pin on said sleeves, prismatic lenses mounted in said sleeves with the apexes of said prisms pointing toward said pins, said cylinders having slots formed therein for receiving said pins to removably position the prismatic lens of one sleeve in relatively opposed relation to the prismatic lens in the other sleeve and means carried by said cylinders for locking said sleeves in said cylinders for rotation therewith.

6. In combination with a stereoscopic training device embodying a pair of lens carrying front cylinders having external ring gears formed integrally therewith for rotating said cylinders in the same direction, a pair of rear cylinders having external ring gears formed integrally therewith and intermeshing with one another for rotating said rear cylinders in opposite directions, said rear cylinders being disposed in aligned relation with said front cylinders, sleeves slidably mounted in said rear cylinders, a pin on the external surface of said sleeves, prismatic lenses mounted in said sleeves with the apexes of said prisms pointing towards said pins, said rear cylinders having slots formed therein for receiving said pins to position the prismatic lens in one sleeve in relatively opposed relation to the prismatic lens in the other sleeve and means on said sleeves engageable with said rear cylinders for limiting the movement of said sleeves into said rear cylinders.

7. In combination with a stereoscopic training device embodying a pair of lens carrying front cylinders having external ring gears formed integrally therewith for rotating said cylinders in the same direction, a pair of rear cylinders having external ring gears formed integrally therewith and intermeshing with one another for rotating said rear cylinders in opposite directions, said rear cylinders being disposed in aligned relation with said front cylinders, sleeves slidably mounted in said rear cylinders, a pin on the external surface of said sleeves, prismatic lenses mounted in said sleeves with the apexes of said prisms pointing towards said pins, said rear cylinders having slots formed therein for receiving said pins to position the prismatic lens in one sleeve in relatively opposed relation to the prismatic lens in the other sleeve and means on said sleeves engageable with said rear cylinders for limiting the movement of said sleeves into said rear cylinders.

GURNEY L. MANDAVILLE.

References Cited in the file of this patent

UNITED STATES PATENTS

| Number | Name | Date |
|---|---|---|
| 739,587 | Case | Sept. 22, 1903 |
| 1,423,091 | De Zeng | July 18, 1922 |
| 1,649,646 | Badgley | Nov. 15, 1927 |
| 1,680,534 | Garbutt et al. | Aug. 14, 1928 |
| 1,804,690 | Hunsicker | May 12, 1931 |
| 2,186,418 | Mandaville | Jan. 9, 1940 |